United States Patent
Schurter et al.

(10) Patent No.: US 8,910,999 B2
(45) Date of Patent: Dec. 16, 2014

(54) LIGHTWEIGHT STEEL DOOR FOR VEHICLE AND METHOD FOR MANUFACTURING THE SAME

(71) Applicant: ArcelorMittal Investigacion y Desarrollo, S.L., Sestao (ES)

(72) Inventors: Paul Schurter, Stoney Creek (CA); Timothy Lim, Burlington (CA); Paul Dolan, Clio, MI (US); Hamed Sharifi, Livonia, MI (US)

(73) Assignee: ArcelorMittal Investigacion y Desarrollo, S.L., Sestao (ES)

( * ) Notice: Subject to any disclaimer, the term of this patent is extended or adjusted under 35 U.S.C. 154(b) by 19 days.

(21) Appl. No.: 13/632,479

(22) Filed: Oct. 1, 2012

(65) Prior Publication Data
US 2013/0088037 A1    Apr. 11, 2013

Related U.S. Application Data

(60) Provisional application No. 61/541,568, filed on Sep. 30, 2011.

(51) Int. Cl.
*B60J 5/00*    (2006.01)
*B60J 5/04*    (2006.01)

(52) U.S. Cl.
CPC .............. *B60J 5/0415* (2013.01); *B60J 5/0483* (2013.01); *B60J 5/0429* (2013.01); *B60J 5/043* (2013.01); *B60J 5/0443* (2013.01); *B60J 5/0463* (2013.01)
USPC .................... 296/146.5; 296/146.6; 296/146.2

(58) Field of Classification Search
CPC ........ B60J 5/0415; B60J 5/0483; B60J 5/043; B60J 5/0463; B60J 5/0443; B60J 5/0429
USPC ................. 296/146.5, 146.6, 146.2
See application file for complete search history.

(56) References Cited

U.S. PATENT DOCUMENTS

| | | | | |
|---|---|---|---|---|
| 6,808,225 B2 * | 10/2004 | Moriyama | ................. | 296/146.6 |
| 7,021,697 B2 * | 4/2006 | Bodin et al. | ............... | 296/146.6 |
| 8,109,559 B2 * | 2/2012 | Nakamori et al. | ......... | 296/146.7 |
| 2007/0102955 A1 * | 5/2007 | Bodin et al. | ............... | 296/146.6 |

FOREIGN PATENT DOCUMENTS

| | | |
|---|---|---|
| DE | 102005011076 A1 | 9/2006 |
| DE | 102005061562 A1 * | 7/2007 |
| EP | 1231091 A1 * | 8/2002 |
| JP | 61169316 A1 | 7/1986 |
| WO | 2008/097152 A1 | 8/2008 |

* cited by examiner

*Primary Examiner* — Dennis H Pedder
(74) *Attorney, Agent, or Firm* — Berenato & White, LLC

(57) ABSTRACT

A vehicle door assembly comprises an inner panel integrally formed by upper and lower horizontal beams interconnected by front and rear upright beams, and an outer panel bonded to the inner panel. The frame portion comprises opposite front and rear U-shaped side frame members non-detachably attached to each other by upper and lower intermediate frame members so as to form a continuous perimeter. The side frame members are made of a first steel material and the intermediate frame members made of a second steel material, which is different from the first steel material. A method for manufacturing the inner panel comprises the steps: providing U-shaped sheets of the first steel material, providing top and bottom sheets of the second steel material, non-detachably connecting the U-shaped sheets to the top and bottom sheets so as to form a blank, and stamping the blank into the frame portion.

16 Claims, 12 Drawing Sheets

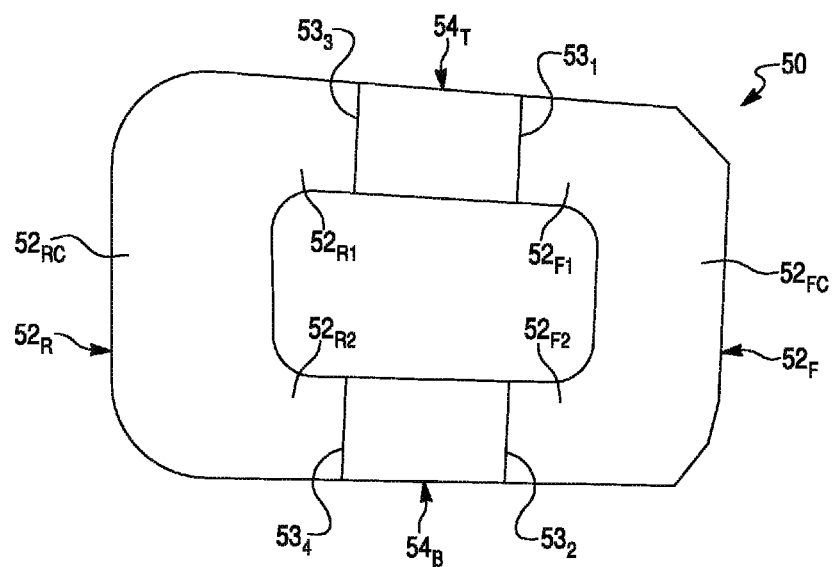
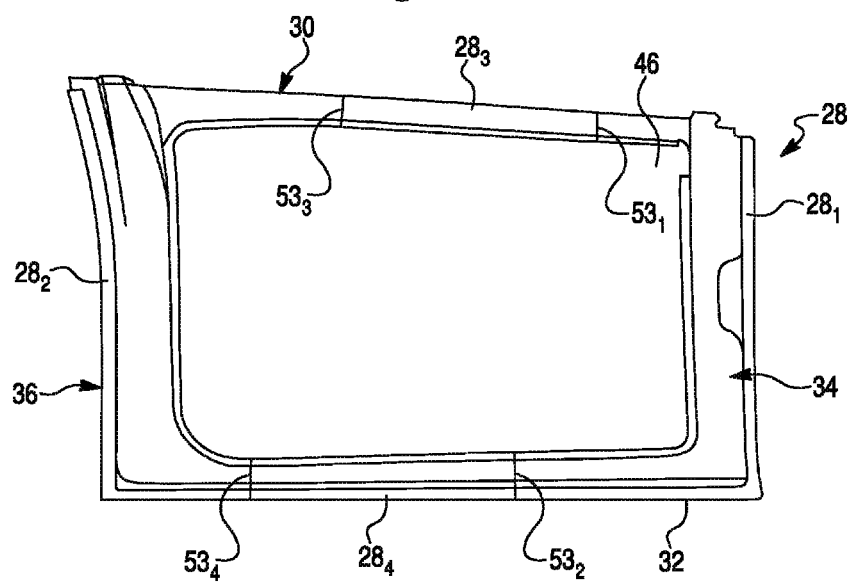

LIGHTWEIGHT STEEL DOOR FOR VEHICLE AND METHOD FOR MANUFACTURING THE SAME

CROSS-REFERENCE TO RELATED APPLICATION

This Application claims the benefit under 35 U.S.C. 119(e) of U.S. Provisional Application Ser. No. 61/541,568 filed Sep. 30, 2011 by Schurter et al., which is hereby incorporated herein by reference in its entirety and to which priority is claimed.

FIELD OF THE INVENTION

The present invention relates to vehicle door assemblies and methods for manufacturing thereof in general and, more particularly, to a lightweight vehicle door assembly and method for manufacturing the same using components made of various interconnected high strength steel grades.

BACKGROUND OF THE INVENTION

Conventionally, vehicle doors comprise a supportive inner panel made of steel material. An outer panel is attached to the inner panel. The conventional inner panel is deep-drawn from mild steel. A beltline beam beneath the window is welded to the inner panel and can be placed either inwardly of or outwardly of the window. Typically, the vehicle doors include a generally horizontally extending side impact guard beam made of steel that has a considerably higher mechanical strength than the steel from which the inner panel is made. The impact guard beam is welded to the inner panel and placed nearest the outer panel. A relatively flat trim is fastened to the inner panel. The inner door components, such as locks, window guides and window elevators, are mounted to the inner panel.

Furthermore, steel sheet has been the most widely used raw material for motor vehicle doors. Steel doors are inexpensive and simple to manufacture. However, conventional steel door designs are relatively heavy in comparison to the mass of newly designed aluminum doors. Accordingly, there is a tendency in the automotive industry to replace steel doors with the doors made of aluminum. The aluminum doors, although lighter than conventional steel doors, are however costlier than steel doors and more complex, difficult and expensive to manufacture.

Therefore, vehicle doors made of steel are susceptible to improvements that may enhance their performance, cost and weight. With this in mind, a need exists to develop an improved vehicle door made of high-strength steel with reduced weight comparable to that of the weight of aluminum doors, improved performance, and inexpensive to manufacture.

SUMMARY OF THE INVENTION

The present invention is directed to a novel lightweight vehicle door assembly, and a method for manufacturing the same.

The vehicle door assembly according to the present invention comprises an inner panel in the form of a substantially rectangular frame portion having a continuous perimeter integrally formed by upper and lower horizontal beams interconnected by front and rear upright beams, and an outer panel attached to the inner panel. The frame portion comprises opposite front and rear U-shaped side frame members non-detachably attached to each other by upper and lower intermediate frame members so as to form a continuous perimeter. The side frame members are made of a first steel material and the intermediate frame members made of a second steel material. The first steel material of the side frame members is different than the second steel material of the intermediate frame members.

The method for manufacturing an inner panel of a vehicle door assembly according to the present invention comprises the steps of providing front and rear flat U-shaped steel sheets of a first steel material such that each of the front and rear U-shaped steel sheets comprises a cross portion and a pair of spaced apart leg portions extending from the cross portion, providing top and bottom flat steel sheets of a second steel material, non-detachably connecting each of the leg portions of each of the U-shaped steel sheets to a respective one of the top and bottom steel sheets so as to form a flat door perimeter frame blank, and stamping the door perimeter frame blank into a perimeter frame portion of an inner panel. The first steel material of the front and rear flat U-shaped steel sheets is different than the second steel material of the top and bottom flat steel sheets. Moreover, the frame portion comprises opposite front and rear U-shaped side frame members non-detachably attached to each other by upper and lower intermediate frame members so as to form the continuous perimeter. The side frame members are made of the first steel material and the intermediate frame members are made of the second steel material, which is higher in strength and thickness to improve resistance to side intrusion.

BRIEF DESCRIPTION OF THE DRAWINGS

The accompanying drawings are incorporated in and constitute a part of the specification. The drawings, together with the general description given above and the detailed description of the exemplary embodiments and methods given below, serve to explain the principles of the invention. In such drawings:

FIG. 9A is a side view of a multi-piece laser welded blank for stamping a frame portion of the inner panel according to the exemplary embodiment of the present invention;

FIG. 9B is a side view of the frame portion of the inner panel according to the exemplary embodiment of the present invention stamped from the multi-piece laser welded blank shown in FIG. 9A;

DETAILED DESCRIPTION OF EXEMPLARY EMBODIMENT(S) AND EXEMPLARY METHOD(S)

Figure 1:
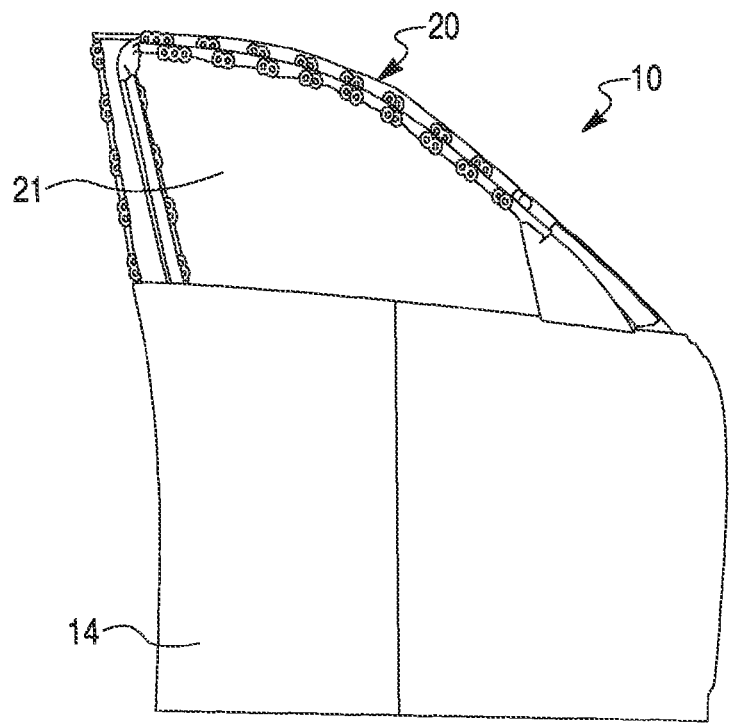
FIG. 1 is a side view of a vehicle right-side front door assembly according to an exemplary embodiment of the present invention.

Reference will now be made in detail to exemplary embodiments and methods of the invention as illustrated in the accompanying drawings, in which like reference characters designate like or corresponding parts throughout the drawings. It should be noted, however, that the invention in its broader aspects is not limited to the specific details, representative devices and methods, and illustrative examples shown and described in connection with the exemplary embodiments and methods.

This description of exemplary embodiments is intended to be read in connection with the accompanying drawings, which are to be considered part of the entire written description. In the description, relative terms such as "horizontal," "vertical," "front," "rear," "upper", "lower", "top" and "bottom" as well as derivatives thereof (e.g., "horizontally," "downwardly," "upwardly," etc.) should be construed to refer to the orientation as then described or as shown in the drawing figure under discussion and to the orientation relative to a vehicle body. These relative terms are for convenience of description and normally are not intended to require a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise. The term "operatively connected" is such an attachment, coupling or connection that allows the pertinent structures to operate as intended by virtue of that relationship. Additionally, the word "a" as used in the claims means "at least one".

Figure 3:
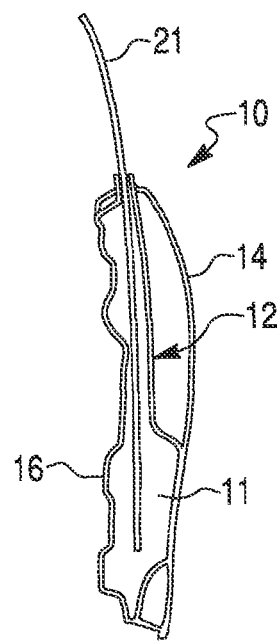
FIG. 3 is a sectional view of the vehicle right-side front door assembly according to the exemplary embodiment of the present invention.

FIGS. 1, 2A, 3, 4 and 5 illustrate a right-side front door assembly 10 of a motor vehicle (especially, a midsize car) according to an exemplary embodiment of the present invention. The door assembly 10 comprises an inner panel 12, an outer panel 14 attached to and supported by flanges of the inner panel 12, a module extension 16 used to receive a pre-assembled door module unit, attached to and supported by an inner surface (i.e., facing a passenger compartment of the motor vehicle) of the inner panel 12, an inner beltline element (or beam) 15 (shown in FIGS. 4 and 5) disposed between the inner panel 12 and the module extension 16, a hinge reinforcement member 18 fastened to a front end 12$_F$ of the inner panel 12, a window frame 20 for a window pane 21 retractably movable in and out of a cavity 11 formed inside the door assembly 10 between the inner panel 12 and the module extension 16 (as shown in FIG. 3), and a front window guide 26.

The inner panel 12, according to the exemplary embodiment of the present invention shown in detail in FIGS. 4-8, is three-piece stamped subassembly including a substantially rectangular perimeter frame portion 28 having a continuous perimeter, a single intermediate upright (vertical) beam (structural element) 38 and a single forward-transverse (or gusset) beam (structural element) 40 that both are non-detachably secured to the perimeter frame portion 28 to stiffen the inner panel 12, provide side intrusion protection, and support the thin-gauge outer panel 14 to improve its stiffness and oil canning performance. Each of the intermediate upright beam 38 and the gusset beam 40 has an open, hat-shaped profile and is formed separately from the perimeter frame portion 28. The perimeter frame portion 28, the intermediate upright beam 38 and the gusset beam 40 are then non-detachably secured to each other, such as by welding, and preferably by laser welding to form the inner panel 12. The perimeter frame portion 28 of the inner panel 12 is integrally formed by upper and lower horizontal beams 30 and 32, respectively, interconnected by front and rear upright beams 34 and 36, respectively.

Figure 6:
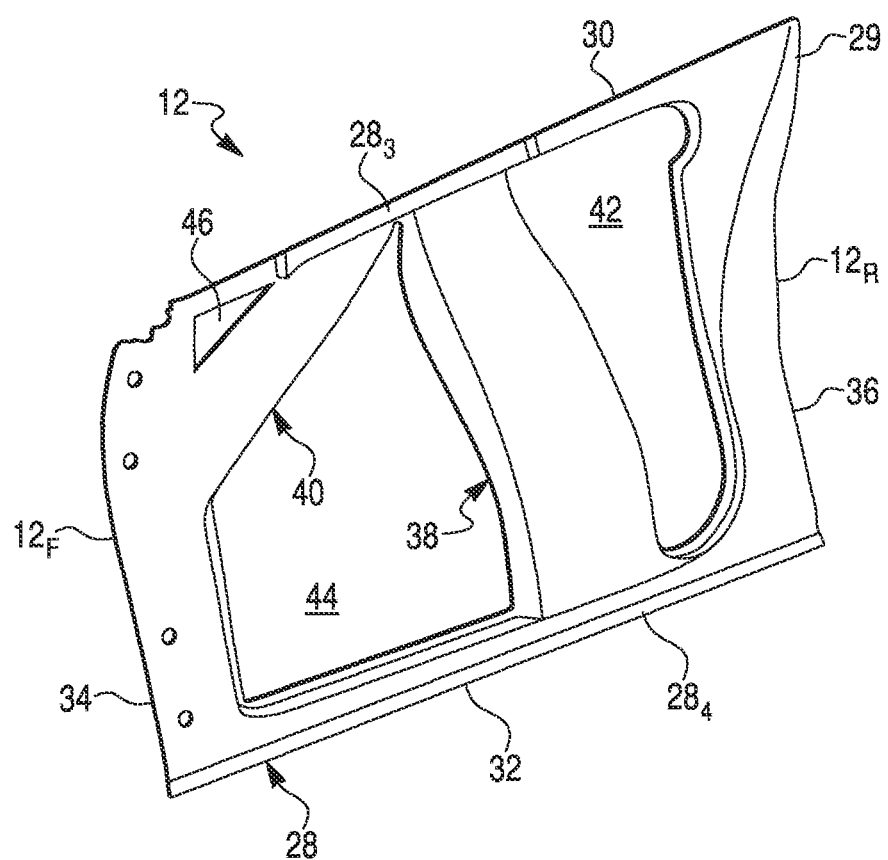
FIG. 6 is a perspective view of an inner panel of the vehicle right-side front door assembly according to the exemplary embodiment of the present invention.
Figure 7:
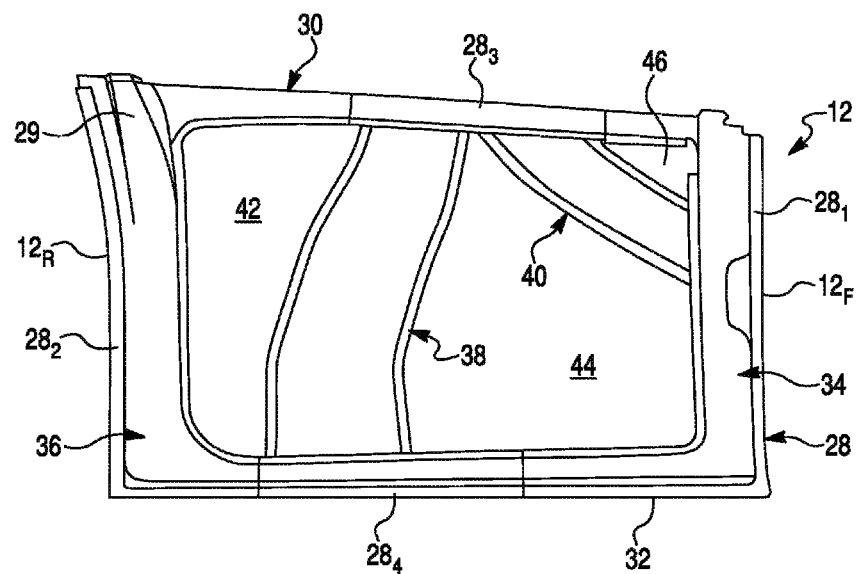
FIG. 7 is a side view of the inner panel of FIG. 6.

As illustrated in detail in FIGS. 6 and 7, the intermediate upright beam 38 substantially vertically extends between the upper and lower horizontal beams 30 and 32 through approximately the middle of the frame portion 28 of the inner panel 12, while the forward-transverse beam 40 is angled so as to extend between the upper horizontal beam 30 and the front upright beam 34. The gusset beam 40 acts as a brace between the front upright beam 34 (and the hinge reinforcement member 18) and the upper horizontal beam 30 beneath the window frame 20. This reinforces the door assembly 10 to improve stiffness. Alternatively, the inner panel 12 may include only the single intermediate upright beam 38, but not the gusset beam 40. The upright vertical beam 38 together with the inner panel 12 and the gusset beam 40 provide an effective means to resist side impact intrusions. Thus, according to the exemplary embodiment of the present invention, the inner panel 12 of the door assembly 10 is devoid of the conventional horizontal intrusion beam (or side impact guard beam) extending substantially horizontally between the front and rear upright beams (structural elements) 34 and 36. The beltline beams (i.e., the upper horizontal beam 30 and the inner beltline beam 15) provide stiffness.

The inner panel 12 of the door assembly 10 is manufactured from Advanced High Strength Steels (AHSS). The method of manufacturing the inner panel 12 of the door assembly 10 according to the exemplary embodiment of the present invention is described below. First, as best shown in FIG. 9A, a substantially rectangular, flat, single door perimeter frame blank 50 having a continuous perimeter is integrally formed from four pieces of steel sheet in order to manufacture the multi-piece frame portion 28 of the inner panel 12. The pieces of steel sheet includes two opposite sheets of front and rear flat U-shaped steel sheets 52$_F$ and 52$_R$, respectively, of a first advanced high strength steel material, and two opposite substantially rectangular top and bottom flat steel sheets 54$_T$ and 54$_B$, respectively, of a second advanced high-strength steel material, which is different from the first steel material and is of higher strength and thickness to improve resistance to side intrusion.

Subsequently, the single laser welded blank 50 is stamped into the perimeter frame portion 28 of the inner panel 12 either by hot stamping or cold stamping.

According to the exemplary embodiment of the present invention, in case of cold-stamping the perimeter frame blank 50, the first steel material is a grade DP 780 steel having thickness (or gauge) of 0.60 mm, while the second steel material is grade MS1300 martensitic steel having thickness of 1.00 mm. It should be understood that steel material is characterized by grade (thus, strength) and thickness (or gauge). For example, a TRIP steel grade can be used instead of the grade DP 780 high-strength steel if there is a need for increased formability in the perimeter frame blank 50. Moreover, the particular grades of the first and second steel materials used in case of hot-stamping the perimeter frame blank 50 are different from those used when cold-stamping. However, in any case, the second steel material is different from the first steel material and is of higher strength and thickness.

Each of the front and rear U-shaped steel sheets $52_F$, $52_R$ comprises a cross portion $52_{FC}$, $52_{RC}$ and a pair of spaced apart leg portions $52_{F1}$ and $52_{F2}$, $52_{R1}$ and $52_{R2}$ extending from the cross portion $52_{FC}$, $52_{RC}$. In order to form the steel blank 50, the front and rear flat U-shaped steel sheets $52_F$ and $52_R$ are oriented so that the leg portions $52_{F1}$, $52_{F2}$ and $52_{R1}$, $52_{R2}$ are aligned and face each other. Then, the top and bottom steel sheets $54_T$ and $54_B$ are placed between the leg portions $52_{F1}$ and $52_{F2}$, $52_{R1}$ and $52_{R2}$ of the U-shaped steel sheets $52_F$, $52_R$ so as to be aligned therewith. Subsequently, each of the leg portions $52_{F1}$ and $52_{F2}$, $52_{R1}$ and $52_{R2}$ of each of the U-shaped steel sheets $52_F$, $52_R$ is non-detachably connected (i.e., fixed) at a free end thereof to the respective top and bottom steel sheets $54_T$ and $54_B$ by any appropriate means known in the art so as to form the steel blank 50. According to the exemplary embodiment of the present invention, the U-shaped steel sheets $52_F$, $52_R$ are seam-welded to the top and bottom steel sheets $54_T$ and $54_B$, such as by laser welding, thus forming a single laser welded blank 50. As a result, the single blank 50 contains different steel materials, i.e., different grades and/or gauges of advanced high strength steel. Specifically, the leg portions $52_{F1}$ and $52_{R1}$ of the front and rear flat U-shaped steel sheets $52_F$ and $52_R$, respectively, are seam-welded to distal ends of the top steel sheet $54_T$ through laser weld joints $53_1$ and $53_3$, while the leg portions $52_{F2}$ and $52_{R2}$ of the front and rear flat U-shaped steel sheets $52_F$ and $52_R$, respectively, are seam-welded to distal ends of the bottom steel sheet $54_B$ through laser weld joints $53_2$ and $53_4$.

Subsequently, the single laser welded blank 50 is stamped into the perimeter frame portion 28 of the inner panel 12 either by hot stamping or cold stamping. In case of hot stamping, the flat steel blank 50 is first heated, then put into a forming tool to form the required shape of the frame portion 28, then the hot-stamped frame portion 28 remains in the tool as it is quickly cooled to increase its strength.

The stamped frame portion 28 of the inner panel 12, illustrated in detail in FIG. 9B, includes front and rear opposite U-shaped side frame members $28_1$ and $28_2$ (stamped from the front and rear flat U-shaped steel sheets $52_F$ and $52_R$) non-detachably secured to each other by upper and lower intermediate frame members $28_3$ and $28_4$ (stamped from the top and bottom steel sheets $54_T$ and $54_B$), spaced from each other, so as to form the continuous perimeter. Moreover, according to the exemplary embodiment of the present invention, leg portions of the front and rear side frame members $28_1$ and $28_2$ are seam-welded to distal ends of the upper and lower intermediate frame members $28_3$ and $28_4$ through laser weld joints $53_1$, $53_2$, $53_3$ and $53_4$. Thus, the frame portion 28 of the inner panel 12 is integrally formed by the front and rear U-shaped side frame members $28_1$ and $28_2$ interconnected by the upper and lower intermediate frame members $28_3$ and $28_4$.

Furthermore, as noted above, in case of cold-stamping the perimeter frame blank 50, the side frame members $28_1$ and $28_2$ of the frame portion 28 are made of the DP 780 grade steel having a thickness of 0.60 mm, while the upper and lower intermediate frame members $28_3$ and $28_4$ are made of MS1300 grade martensitic steel having a thickness of 1.00 mm. Thus, the steel material of the side frame members $28_1$ and $28_2$ is different from the steel materials of the upper and lower intermediate frame members $28_3$ and $28_4$ (i.e., has different grade and/or gauge).

Next, each of the intermediate upright beam 38 and the gusset beam 40 is hot- or cold-stamped separately from the frame portion 28 and from each other. In other words, each of the intermediate upright beam 38 and the gusset beam 40 according to the exemplary embodiment of the present invention is a single-piece hot or cold stamped member. The intermediate upright beam 38 is stamped from a flat, very thin gauge sheet of high strength steel blank of a third steel material, such as USIBOR® 1500P having a thickness of 0.60 mm, that is different from the first steel material of the side frame members $28_1$ and $28_2$ and the second steel material of the intermediate frame members $28_3$ and $28_4$. Similarly, the gusset beam 40 is stamped from a flat, very thin gauge sheet of high strength steel blank of a fourth steel material, such as USIBOR® 1500P having a thickness of 0.60 mm, that is different from the first steel material of the side frame members $28_1$ and $28_2$ and the second steel material of the intermediate frame members $28_3$ and $28_4$.

Currently, minimum thicknesses of hot stamped steel parts are about 0.90 mm. USIBOR® 1500P is a hardenable boron alloyed steel coated with an Al—Si coating from ArcelorMittal, frequently used when high strength is required. Aluminum-silicon coatings protect steel from oxidation during heating and provide corrosion protection for the component. In case of hot-stamping process, manufacturing is done in a press hardening line, where a heated (900° C.) steel blank is formed and then rapidly cooled (quenched) to room temperature in a water-cooled forming tool. The result is a hardened part with a yield strength of about 1100 MPa and an ultimate strength of about 1500 MPa.

Figure 8:
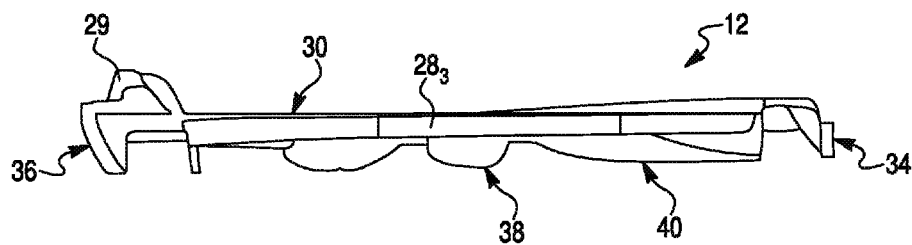
FIG. 8 is top view of the inner panel of FIG. 6.

Finally, the frame portion 28, the intermediate upright beam 38 and the gusset beam 40 are non-detachably joined together after stamping (such as welded, and preferably laser welded) to form the multi-part inner panel 12 as shown in FIGS. 6-8.

As best shown in FIGS. 6 and 7, the intermediate upright beam 38 substantially vertically extends between the upper and lower horizontal beams 30 and 32 through approximately the middle of the perimeter frame portion 28 of the inner panel 12 such that distal ends of the intermediate upright beam 38 are non-detachably attached to the upper and lower intermediate frame members $28_3$ and $28_4$ of the perimeter frame portion 28. Thus, the intermediate upright beam 38 extends between the thicker sections of the frame portion 28. In turn, the gusset beam 40 extends between the upper horizontal beam 30 and the front upright beam 34 such that distal ends of the gusset beam 40 are non-detachably attached to the upper intermediate frame member $28_3$ and the front side frame member $28_1$ of the frame portion 28.

As noted above, each of the intermediate upright beam 38 and the gusset beam 40 is hot- or cold-stamped separately from the frame portion 28 and from each other. Alternatively, the inner panel 12 can be made in the form of a single-piece hot- or cold-stamped member.

As further illustrated in detail in FIGS. 6 and 7, the intermediate upright beam 38 and the gusset beam 40 define three openings 42, 44 and 46 in the inner panel 12. The openings 42, 44 and 46 are formed within the rectangular frame portion 28 (defined by the horizontal beams 30, 32 and the upright beams 34, 36) by the intermediate upright beam 38 and the gusset beam 40. Specifically, the first opening 42 is defined between the upper and lower horizontal beams 30 and 32, the rear upright beam 36 and the intermediate upright beam 38. The second opening 44 is defined between the gusset beam 40, the front upright beam 34, the lower horizontal beam 32 and the intermediate upright beam 38. The third opening 46 is defined between the upper horizontal beam 30, the gusset beam 40 and the front upright beam 34. Alternatively, the gusset beam 40 and the opening 46 need not be provided.

According to the exemplary embodiment of the present invention, as shown in FIGS. 10 and 12-16, each of the lower horizontal beam 32, the front upright beam 34 and the rear upright beam 36 of the frame portion 28 has an open, hat-shaped profile with a crown portion $33_C$, $35_C$ and $37_C$, respectively, and a pair of spaced apart flanges $33_F$, $35_F$ and $37_F$, respectively, extending from the crown portion in the direction away from an interior (i.e., a passenger compartment) of the vehicle and towards the outer panel 14 of the door assembly 10. Moreover, each of the flanges $33_F$, $35_F$ and $37_F$ is provided with a lip $33_L$, $35_L$ and $37_L$, respectively, extending from a distal end thereof. Each of the lips $33_L$, $35_L$ and $37_L$ is shaped and sized to meet (engage) an inner surface of the outer panel 14.

As further illustrated in FIGS. 6-8, 10 and 18, the upper horizontal beam 30 includes a main portion $31_M$ and a flange $31_F$ extending from the main portion $31_M$ in the direction away from the interior (i.e., the passenger compartment) of the vehicle and towards the outer panel 14 of the door assembly 10. The flange $31_F$ is provided with a lip $31_L$ extending from a distal end thereof. Each of the lips $31_L$ is shaped to meet (engage) an inner surface of the outer panel 14. The main portion $31_M$ extends substantially vertically in the direction of the crown portions $33_C$, $35_C$ and $37_C$ of the lower horizontal beam 32, the front upright beam 34 and the rear upright beam 36 of the frame portion 28.

Figure 10:
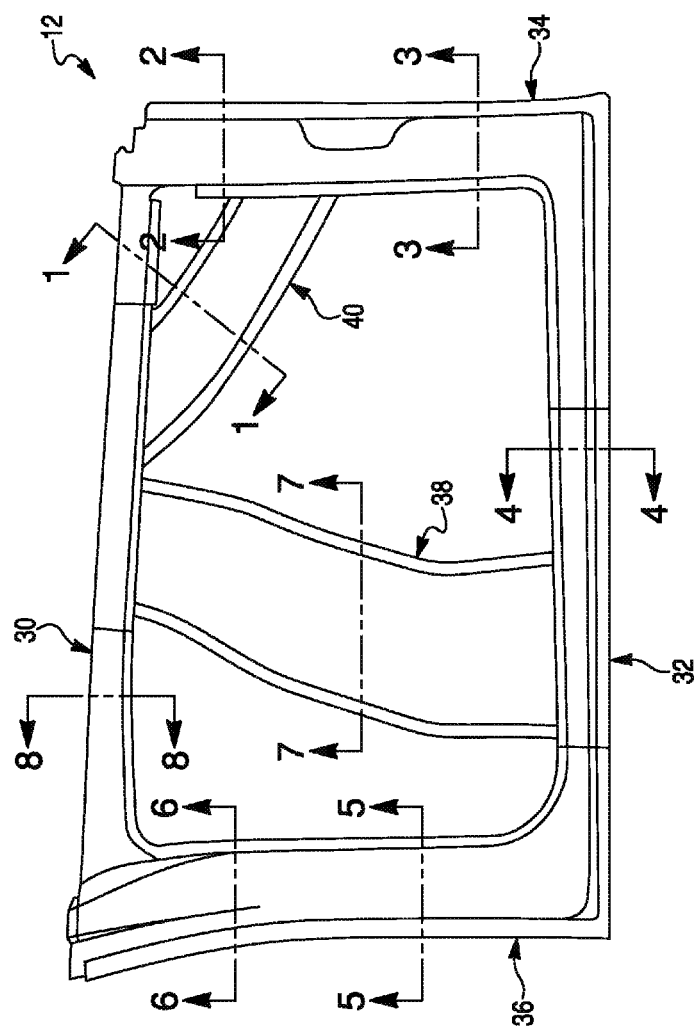
FIG. 10 is a side view of the inner panel of according to the exemplary embodiment of the present invention showing cross-sectional lines.
Figure 11:
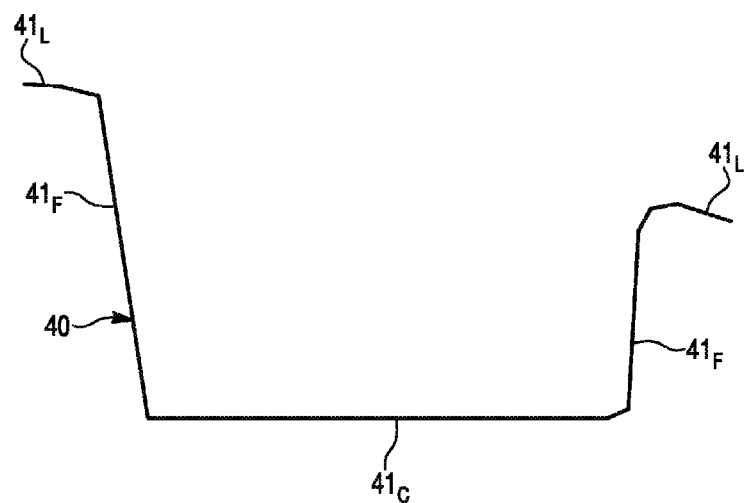
FIG. 11 is a cross-sectional view of the inner panel of FIG. 6 taken along the line 1-1 shown in FIG. 10.
Figure 12:
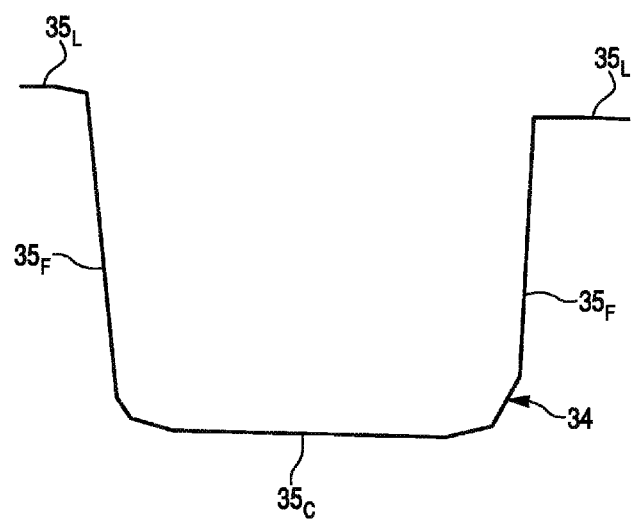
FIG. 12 is a cross-sectional view of the inner panel of FIG. 6 taken along the line 2-2 shown in FIG. 10.
Figure 13:
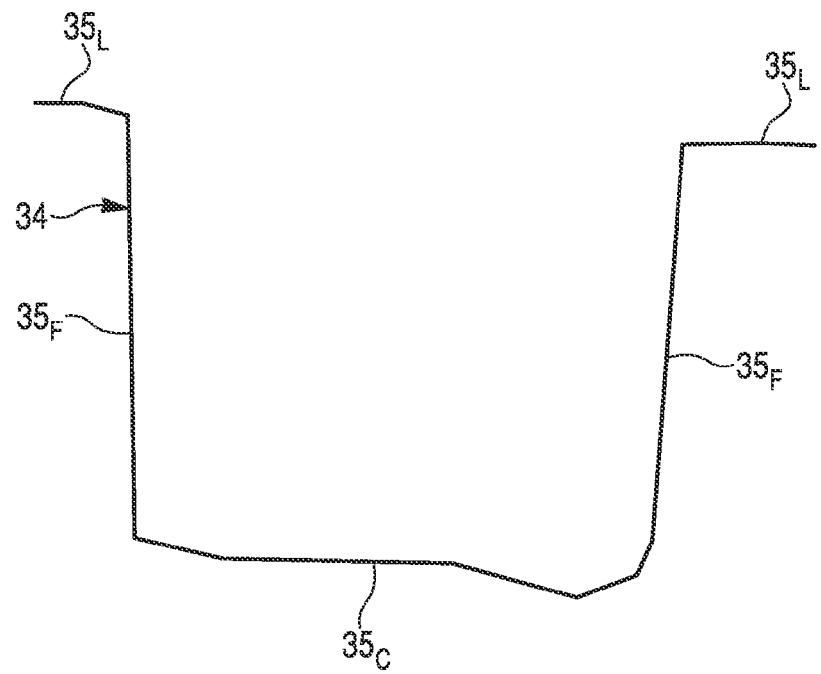
FIG. 13 is a cross-sectional view of the inner panel of FIG. 6 taken along the line 3-3 shown in FIG. 10.
Figure 14:
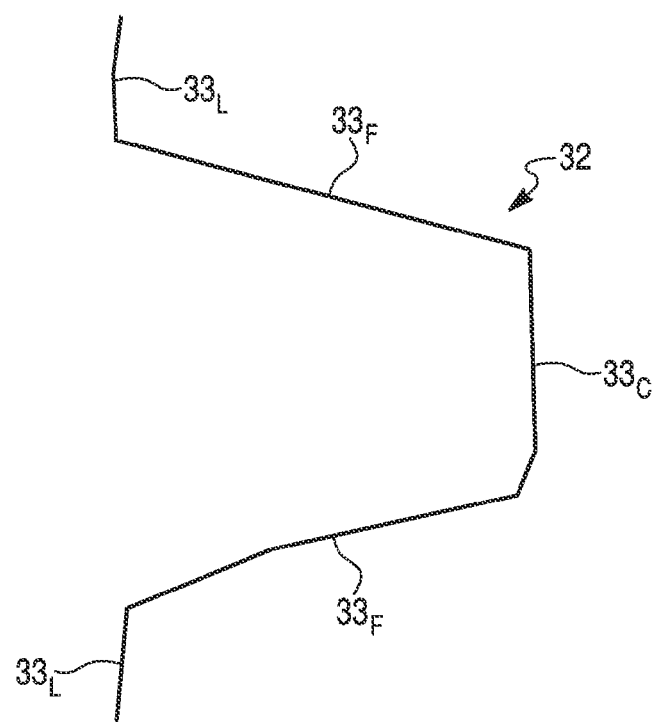
FIG. 14 is a cross-sectional view of the inner panel of FIG. 6 taken along the line 4-4 shown in FIG. 10.
Figure 15:
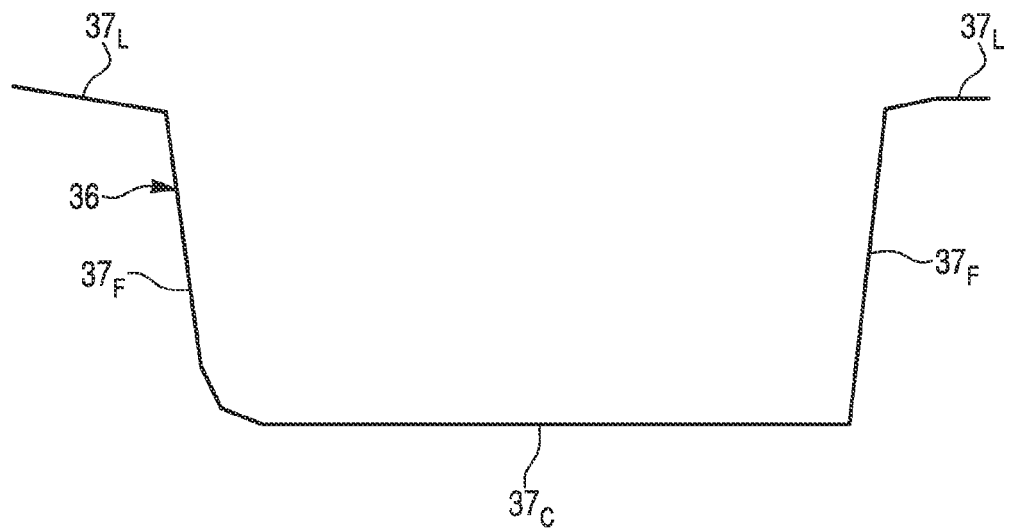
FIG. 15 is a cross-sectional view of the inner panel of FIG. 6 taken along the line 5-5 shown in FIG. 10.
Figure 16:
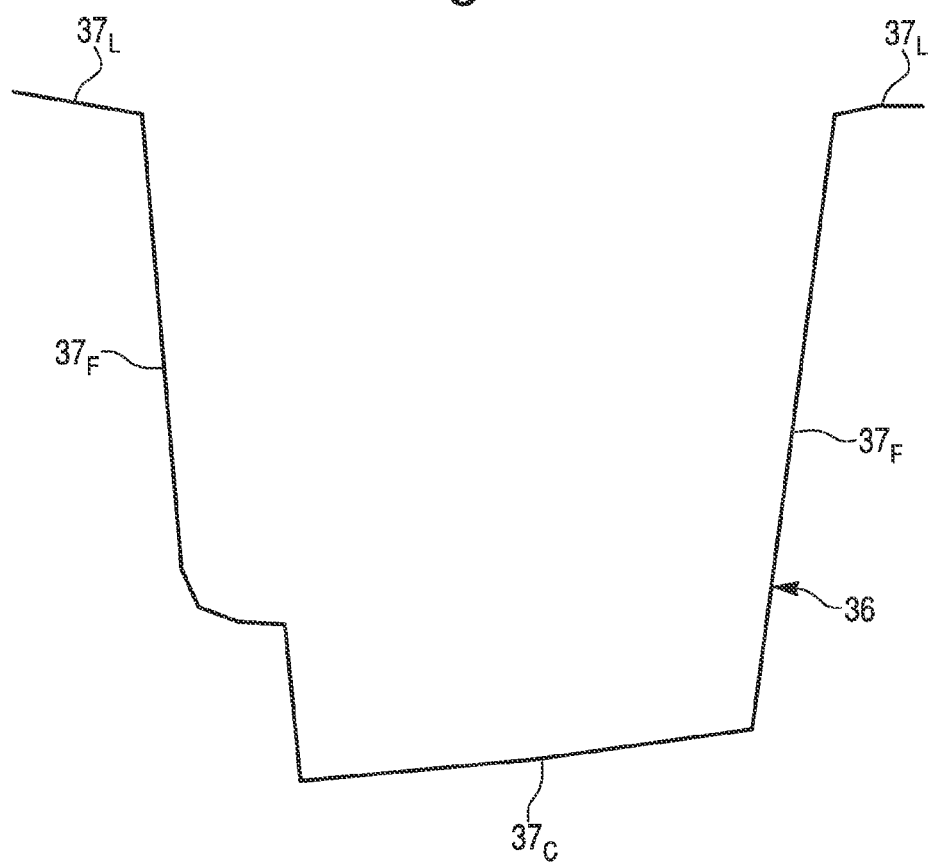
FIG. 16 is a cross-sectional view of the inner panel of FIG. 6 taken along the line 6-6 shown in FIG. 10.
Figure 17:
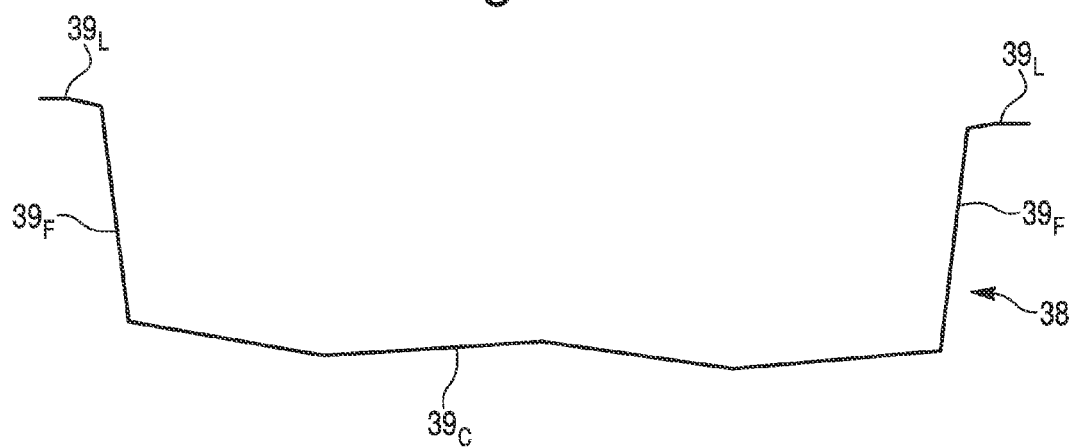
FIG. 17 is a cross-sectional view of the inner panel of FIG. 6 taken along the line 7-7 shown in FIG. 10.
Figure 18:
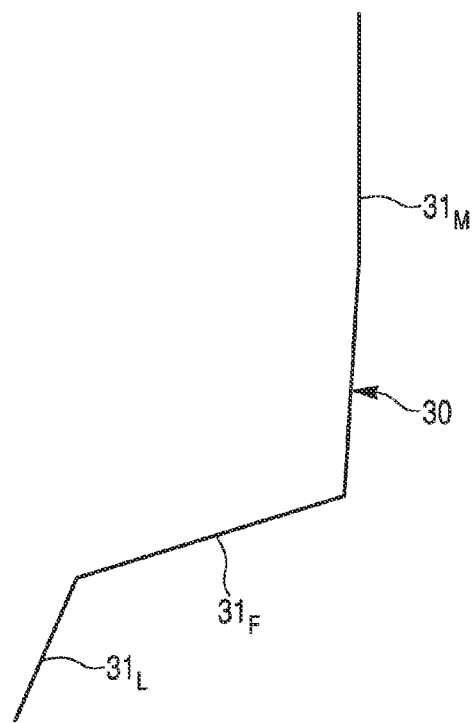
FIG. 18 is a cross-sectional view of the inner panel of FIG. 6 taken along the line 8-8 shown in FIG. 10.

Further according to the exemplary embodiment of the present invention, as shown in FIGS. 10, 11 and 17, both the intermediate upright beam 38 and the gusset beam 40 have an open, Hat-shaped profile each having a crown portion $39_C$ and $41_C$, respectively, and a pair of spaced apart flanges $39_F$ and $41_F$, respectively, extending from the crown portion $39_C$, $41_C$ in the direction away from the interior (i.e., the passenger compartment) of the vehicle and towards the outer panel 14 of the door assembly 10. Moreover, each of the flanges $39_F$ and $41_F$ is provided with a lip $39_L$ and $41_L$, respectively, extending from a distal end thereof. Each of the lips $39_L$ and $41_L$ is shaped to meet (engage) an inner surface of the outer panel 14.

Figure 4:
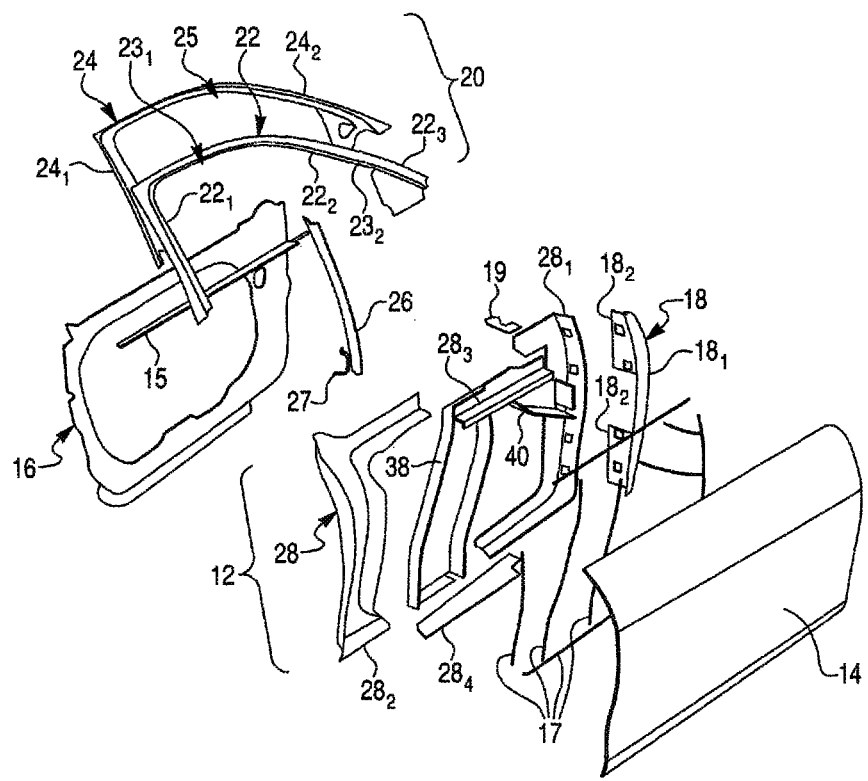
FIG. 4 is an exploded assembly drawing in perspective of the vehicle right-side front door assembly according to the exemplary embodiment of the present invention.
Figure 5:
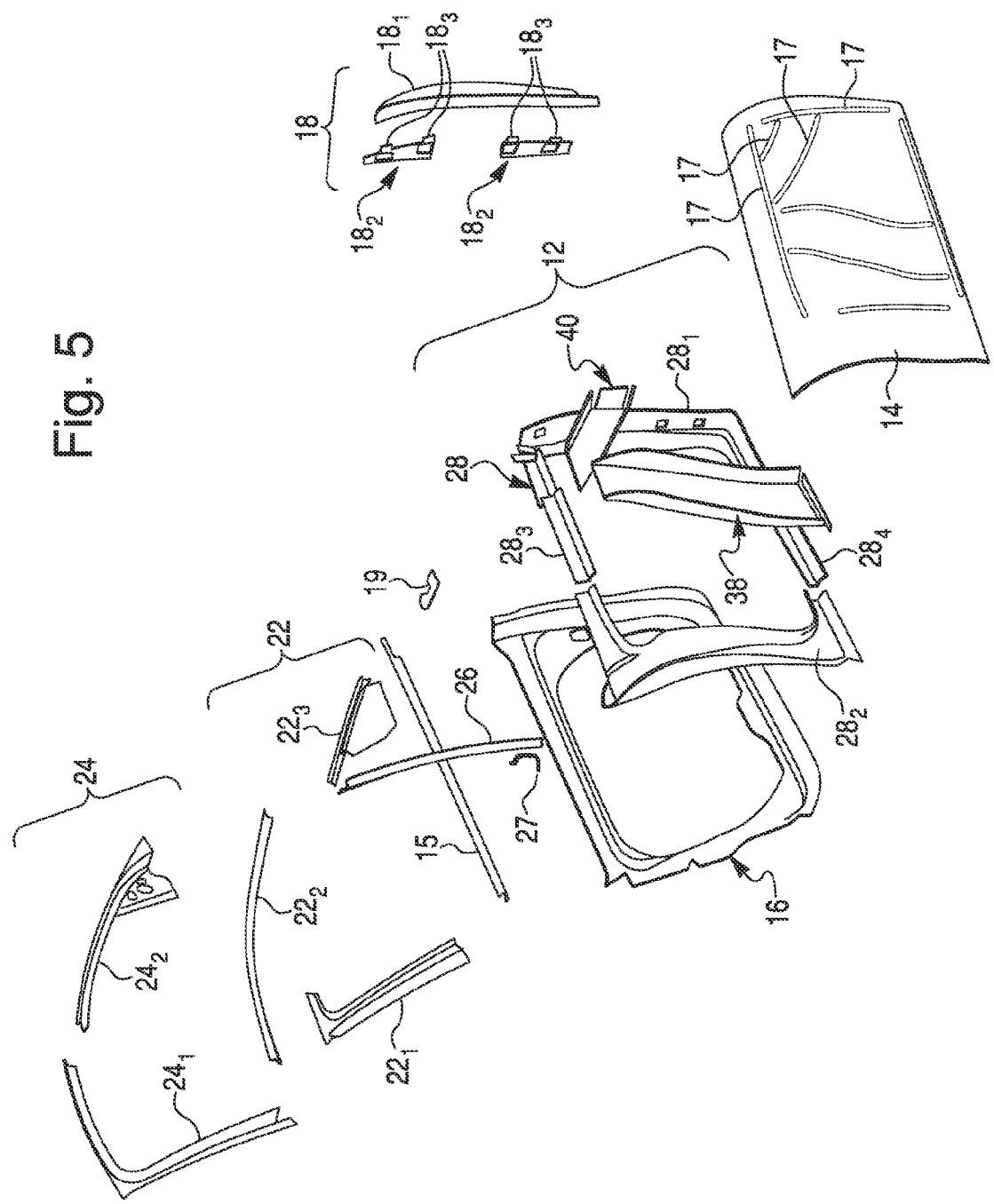
FIG. 5 is an exploded assembly drawing in perspective of structural elements of the vehicle right-side front door assembly according to the exemplary embodiment of the present invention.

The front end $12_F$ of the inner panel 12 is an end portion of the inner panel 12 at which the door assembly 10 is pivotally suspended to a front hinge pillar (A-pillar) of a body of the motor vehicle by at least one hinge member through the hinge reinforcement member 18. Preferably, the inner panel 12 is pivotally suspended to the front hinge pillar (A-pillar) of the vehicle body by two hinges and has the integrated hinge reinforcement member 18 welded to the front end $12_F$ of the inner panel 12. A rear end $12_R$ of the inner panel 12 is an end portion of the inner panel 12 at which a lock of the door assembly 10 is provided so as to cooperate with a mid-pillar (B-pillar) of the body of the motor vehicle. As noted above, the hinge reinforcement member 18 is fastened to the front end $12_F$ of the inner panel 12. According to the exemplary embodiment of the present invention, the hinge reinforcement member 18 is formed from a laser welded blank of three separate pieces of high-strength steel sheet, as shown in FIG. 5, integrally fixed to each other, as shown in FIG. 4: a primary piece $18_1$ made of dual-phase steel such as DP 600 having thickness of 0.60 mm and two vertically spaced secondary pieces $18_2$ each made of dual-phase steel such as DP 980 having thickness of 1.50 mm. Each of the secondary pieces $18_2$ of the hinge reinforcement member 18 can be provided with two washers $18_3$ each made of dual-phase steel such as DP 600 having thickness of 3.50 mm. Alternatively, the hinge reinforcement member 18 can be made of other grades and gauges of steel. In other words, the hinge reinforcement member 18 is formed from the laser welded blank including the primary steel piece $18_1$ and two secondary steel pieces $18_2$ seam-welded together into the single laser welded blank, which is then stamped into a final part (the hinge reinforcement member 18) including different grades (or types) and thickness of steel.

The outer panel 14 according to the exemplary embodiment of the present invention is adhesively bonded to the lips $31_L$, $33_L$, $35_L$, $37_L$, $39_L$ and $41_L$ of the flanges $31_F$, $33_F$, $35_F$, $37_F$, $39_F$ and $41_F$, respectively, of the inner panel 12, closing out the hat-shaped sections of the lower horizontal beam 32, the front upright beam 34 and the rear upright beam 36 of the frame portion 28, and the intermediate upright and gusset beams 38 and 40 and forming an even stronger, stiffer inner structure. As best shown, in FIGS. 4 and 5, beads 17 of an appropriate adhesive material are deposited between the lips $31_L$, $33_L$, $35_L$, $37_L$, $39_L$ and $41_L$, of the inner panel 12 and the outer panel 14. This enables the outer panel 14 to stabilize the flanges $31_F$, $33_F$, $35_F$, $37_F$, $39_F$ and $41_F$ of the inner panel 12 during side intrusion events, thus improving the resistance of the door assembly 10 to side intrusion. In the exemplary embodiment of the present invention shown in FIG. 5, the beads 17 of the adhesive material are deposited to an inner surface of the outer panel 14 so as to face the lips $31_L$, $33_L$, $35_L$, $37_L$, $39_L$ and $41_L$ of the inner panel 12. Alternatively, the beads 17 of the adhesive material are deposited directly to the lips $31_L$, $33_L$, $35_L$, $37_L$, $39_L$ and $41_L$ of the inner panel 12. Preferably, the adhesive material used to adhesively bond the outer panel 14 to the inner panel 12 is a structural adhesive having sufficient bond strength to adhere the inner and outer panels 12 and 14 without causing a "read-through" effect on the outside of the outer panel 14.

According to the exemplary embodiment of the present invention, the outer panel 14 is formed of steel sheet, such as exposed quality dual-phase FF280DP steel of ArcelorMittal, having a thickness of about 0.55 mm. The lightweight, thin-gauge high-strength steel outer panel 14 reduces weight of the vehicle door relative to the conventional, lower strength, heavier gauge designs without compromising dent resistance. The lightweight outer panel 14 made from the 0.55 mm FF280DP grade high-strength steel maintains required dent resistance at minimum mass. The outer panel 14 structurally bonded to the inner panel 12 enables the outer panel 14 to work synergistically with the inner panel 12 to achieve performance requirements.

The module extension 16 according to the exemplary embodiment of the present invention is formed of dual-phase steel such as DP500 grade having a thickness of about 0.50 mm, or other suitable grades and gauges of steel. The inner beltline beam 15 is fixed between the upper horizontal beam 30 of the inner panel 12 and the module extension 16 and is formed of hot-stamped high strength steel, such as USI-BOR® 1500P having a thickness of about 0.50 mm, or other suitable grades and gauges of steel. A beltline inner bracket 19 is made of DP500 steel grade having thickness of 0.55 mm in the exemplary embodiment of the present invention.

As further illustrated in FIGS. 4 and 5, the window frame 20 comprises an outer window frame member 22 and an inner window frame member 24 facing the passenger compartment of the vehicle. The outer and inner window frame members 22, 24 are welded to each other and to the inner panel 12, preferably by laser or spot welding. The outer and inner window frame members 22 and 24 may be formed by cold- or hot-stamping from integral, multi-piece laser weld blanks, with laser weld joints staggered between the outer and inner window frame members 22, 24 of the window frame 20. Alternatively, the outer and inner window frame members 22 and 24 may be roll-formed. The outer window frame member 22 according to the exemplary embodiment of the present invention, shown in detail in FIGS. 4 and 5, is made of three separate pieces $22_1$, $22_2$ and $22_3$, which are integrally fixed to each other, such as by laser welding through laser weld joints $23_1$ and $23_2$. The outer window frame member 22 is manufactured by, first, providing first, second and third flat sheets made of first, second and third outer window steel materials, respectively, which are different from each other. Then, the first, second and third flat sheets are non-detachably attached to each other so as to form a single outer window blank. Next, the outer window blank is stamped into the single outer window frame member 22.

According to the exemplary embodiment of the present invention, the first piece $22_1$ of the outer window frame member 22 is made of BH210 grade steel with thickness of 0.50 mm (first outer window steel material), the second piece $22_2$ is made of DP500 grade steel having thickness of 0.55 mm (second outer window steel material), while the third piece $22_3$ (a mirror flag portion) is made of USIBOR® 1500P grade steel having thickness of 0.50 mm (third outer window steel material). Alternatively, other suitable grades and gauges of steel can be used.

The inner window frame member 24 according to the exemplary embodiment of the present invention, shown in detail in FIGS. 4 and 5, is made of two separate pieces $24_1$ and $24_2$, which are integrally fixed to each other, such as by laser welding through a laser weld joint 25. The inner window frame member 24 is manufactured by, first, providing first and second flat sheets made of first and second inner window steel materials, respectively. Next, the first and second flat sheets are non-detachably attached to each other so as to form a single inner window blank. Then, the inner window blank is stamped into the single inner window frame member. The first and second inner window steel materials are different from each other.

According to the exemplary embodiment of the present invention, the first piece $24_1$ of the outer window frame member 22 is made of DP500 grade steel having a thickness of 0.58 mm (first inner window steel material), while the second piece $24_2$ (including a mirror flag portion) is made of dual-phase DP 600 steel having a thickness of 0.76 mm (second inner window steel material). Alternatively, other suitable grades and gauges of steel can be used.

The front window guide 26, normally an add-on component used only for glass fixation, is utilized in the present design as a structural element, providing stiffness to the mirror flag and stiffness to the upper window frame structure. Also, the front window guide 26 stiffens the mirror flag area of the window frame 20. According to the exemplary embodiment of the present invention, the front window guide 26 is made of Drawing Quality Special Killed Steel DQSK having a thickness of 0.80 mm (or other suitable grades and gauges of steel). A window guide bracket 27 is made of DP780 grade steel having thickness of 0.50 mm in the exemplary embodiment of the present invention.

Figure 2A:
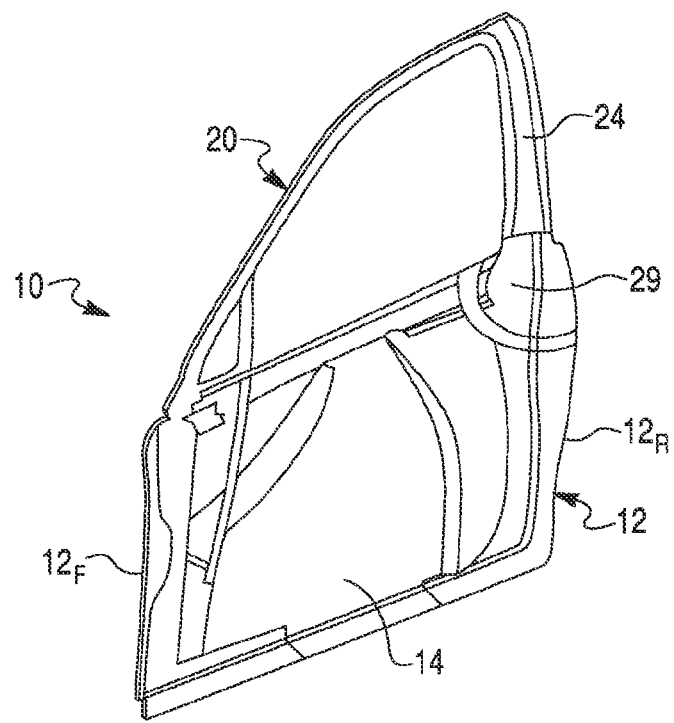
FIG. 2A is a partial perspective view of the vehicle right-side front door assembly according to the exemplary embodiment of the present invention.
Figure 2B:
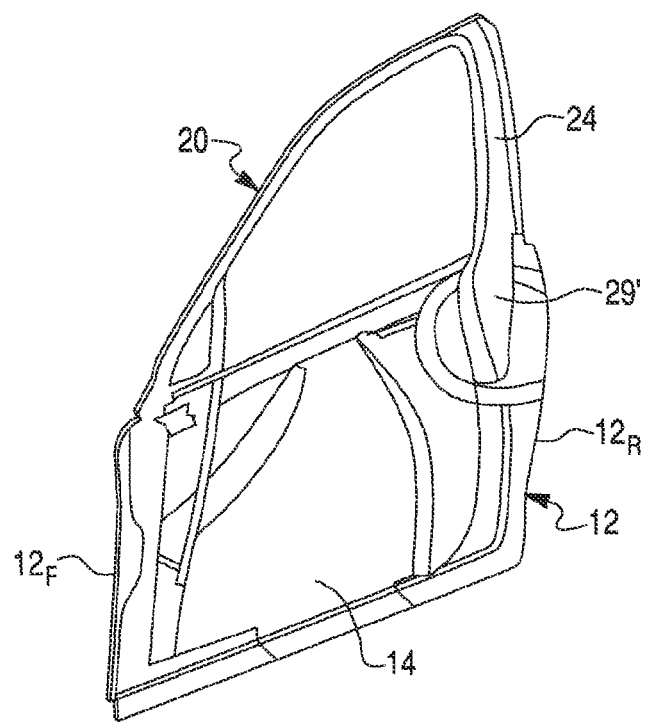
FIG. 2B is a partial perspective view of the vehicle right-side front door assembly according to an alternative embodiment of the present invention.

As illustrated in FIGS. 2A and 6-8, the rear upright beam 36 of the inner panel 12 is provided with a deep draw section 29 in contact with the inner window frame member 24. Alternatively, as illustrated in FIG. 2B, a deep draw section 29' can be integrated into (i.e., formed as a single piece with) the inner window frame member 24 of the window frame 20 for better manufacturability and possibly better structural performance.

The present invention provides a novel lightweight steel door assembly for a vehicle by creating optimized load paths and by causing every component in the door assembly to perform multiple strengthening and stiffening functions. The door assembly according to the present invention provides weight reduction in a steel solution that approaches that of an aluminum solution, while maintaining required strength and stiffness, at a total manufacturing cost that is substantially lower than that of aluminum solutions. The present invention employs load path optimization to develop an efficient structure (i.e., places structural elements along important load paths). This maximizes efficiency and brings all components of the door assembly together to each perform multiple functions in achieving door structural strength, stiffness, and passenger compartment intrusion protection performance goals. The present invention further utilizes novel applications of materials, hot and/or cold stamping, and laser welding. The door assembly of the present invention includes an inner panel comprising a frame portion hot or cold stamped from a multi-piece laser welded blank, and separately hot or cold stamped intermediate upright and gusset beams non-detachably connected to the frame portion. The hot stamping design also provides strength and stiffness in the beltline area, eliminating the need for additional reinforcements in this area. The unique door architecture, with the reinforcing inner panel disposed outside of the glass window pane and supported by the outer panel, provides improved stiffness and side intrusion behaviour.

The foregoing description of the exemplary embodiments of the present invention has been presented for the purpose of illustration in accordance with the provisions of the Patent Statutes. It is not intended to be exhaustive or to limit the invention to the precise forms disclosed. Obvious modifications or variations are possible in light of the above teachings. The embodiments disclosed hereinabove were chosen in order to best illustrate the principles of the present invention and its practical application to thereby enable those of ordinary skill in the art to best utilize the invention in various embodiments and with various modifications as are suited to the particular use contemplated, as long as the principles described herein are followed. Thus, changes can be made in the above-described invention without departing from the intent and scope thereof. It is also intended that the scope of the present invention be defined by the claims appended thereto.

What is claimed is:

1. A vehicle door assembly comprising:
   an inner panel including:
      a substantially rectangular frame portion having a continuous perimeter integrally formed by upper and lower horizontal beams interconnected by front and rear upright beams;
      a single intermediate upright beam extending between said upper and lower horizontal beams of said frame portion; and an outer panel attached to said inner panel;
said frame portion comprising opposite front and rear U-shaped side frame members non-detachably attached to each other by upper and lower intermediate frame members so as to form a continuous perimeter;
a single gusset beam non-detachably secured to said frame portion and slanted so as to extend between said front U-shaped side frame member and said upper intermediate frame member; and
said side frame members made of a first steel material and said intermediate frame members made of a second steel material;
said first steel material of said side frame members being different from said second steel material of said intermediate frame members;
said intermediate upright beam non-detachably attached to said intermediate frame members of said frame portion at distal ends thereof;
said intermediate upright beam made of a third steel material different from said second steel material of said intermediate frame members;
said gusset beam made of a fourth steel material different from said second steel material of said intermediate frame members.

2. The vehicle door assembly as defined in claim 1, wherein said second steel material of said intermediate frame members is thicker than said first steel material of said side frame members.

3. The vehicle door assembly as defined in claim 1, wherein said first steel material of said side frame members is different from said third steel material of said intermediate upright beam.

4. The vehicle door assembly as defined in claim 3, wherein said second steel material of said intermediate frame members is thicker than said first steel material of said side frame members and thicker than said third steel material of said intermediate upright beam.

5. The vehicle door assembly as defined in claim 3, wherein said first steel material of said side frame members is different from said fourth steel material of said gusset beam.

6. The vehicle door assembly as defined in claim 3, wherein said third steel material of said intermediate upright beam is the same as said fourth steel material of said gusset beam.

7. The vehicle door assembly as defined in claim 3, wherein said second steel material of said intermediate frame members is thicker than said first steel material of said side frame members, thicker than said third steel material of said intermediate upright beam and thicker than said fourth steel material of said gusset beam.

8. The vehicle door assembly as defined in claim 1, further comprising a module extension attached to said inner panel so that said inner panel is disposed between said outer panel and said module extension.

9. The vehicle door assembly as defined in claim 8, further comprising a retractable window pane disposed between said module extension and said inner panel.

10. The vehicle door assembly as defined in claim 1, further comprising a window frame that comprises an outer window frame member and an inner window frame member fixed to each other and to said inner panel.

11. A vehicle door assembly, comprising:
an inner panel in the form of a substantially rectangular frame portion having a continuous perimeter integrally formed by upper and lower horizontal beams interconnected by front and rear upright beams;
an outer panel attached to said inner panel; and
a window frame comprising an outer window frame member and an inner window frame member fixed to each other and to said inner panel;
said frame portion comprising opposite front and rear U-shaped side frame members non-detachably attached to each other by upper and lower intermediate frame members so as to form a continuous perimeter;
said side frame members made of a first steel material and said intermediate frame members made of a second steel material;
said first steel material of said side frame members being different from said second steel material of said intermediate frame members;
said outer window frame member including first, second and third separate pieces integrally fixed to each other;
said second outer window piece disposed between said first outer window steel material and said third outer window steel material;
said first outer window piece made of a first outer window steel material, said second outer window piece made of a second outer window steel material, and said third outer window piece made of a third outer window steel material; and
said first, second and third outer window steel materials being different from each other.

12. The vehicle door assembly as defined in claim 11, wherein said second outer window steel material is thicker than both said first outer window steel material and said third outer window steel material.

13. The vehicle door assembly as defined in claim 11, wherein said inner window frame member includes first and second separate pieces integrally fixed to each other; wherein said first inner window piece is made of a first inner window steel material and said second inner window piece is made of a second inner window steel material; and wherein said first and second inner window steel materials are different from each other.

14. The vehicle door assembly as defined in claim 13, wherein said second inner window steel material is thicker than said first inner window steel material.

15. The vehicle door assembly as defined in claim 1, further comprising beads of adhesive material disposed between said outer panel and said inner panel.

16. The vehicle door assembly as defined in claim 15, wherein each of said upper and lower horizontal beams and said front and rear upright beams has an open profile with a crown portion and a flange extending from said crown portion in the direction towards said outer panel of said door assembly; wherein each of said flanges of said upper and lower horizontal beams and said front and rear upright beams is provided with a lip extending from a distal end thereof; and wherein said beads of adhesive material are disposed between an inner surface of said outer panel and said lips of said inner panel.

* * * * *